United States Patent [19]

Nishii

[11] Patent Number: 4,800,799
[45] Date of Patent: Jan. 31, 1989

[54] VACUUM TYPE BRAKE BOOSTER

[75] Inventor: Michiharu Nishii, Toyoya, Japan

[73] Assignee: Aisin Seiki Kabushiki Kaisha, Kariya, Japan

[21] Appl. No.: 836,641

[22] Filed: Mar. 5, 1986

[30] Foreign Application Priority Data

Mar. 5, 1985 [JP] Japan .................................. 60-043883
Mar. 5, 1985 [JP] Japan ........................... 60-032121[U]

[51] Int. Cl.⁴ ............................................... F15B 9/10
[52] U.S. Cl. ....................................91/369.2; 91/376 R
[58] Field of Search .................. 91/369 A, 519, 376 R, 91/6; 92/49

[56] References Cited

U.S. PATENT DOCUMENTS

| | | | |
|---|---|---|---|
| 3,543,298 | 11/1970 | Rockwell | 91/369 A |
| 4,256,016 | 3/1981 | Thomas | 91/369 A |
| 4,434,619 | 3/1984 | Kobayashi | 92/49 |
| 4,445,333 | 5/1984 | Coleman | 60/588 |
| 4,453,450 | 6/1984 | Horsting | 91/376 R |
| 4,472,997 | 9/1984 | Ohmi | 91/376 R |
| 4,587,884 | 5/1986 | Tsubouchi | 91/369 A |
| 4,587,885 | 5/1986 | Boehm et al. | 91/376 R |
| 4,590,845 | 5/1986 | Tateoka et al. | 91/369 A |
| 4,594,937 | 6/1986 | Meynier et al. | 91/369 R |
| 4,598,625 | 7/1986 | Belart | 91/369 R |
| 4,619,185 | 10/1986 | Mori et al. | 91/369 R |

FOREIGN PATENT DOCUMENTS 57-130845 8/1982 Japan .

Primary Examiner—Edward K. Look
Attorney, Agent, or Firm—Burns, Doane, Swecker & Mathis

[57] ABSTRACT

The present invention relates to a booster for automobile braking systems. The booster includes a booster housing with a movable wall disposed in the booster housing and dividing the interior of the housing into a constant pressure chamber connected to a vacuum source and a variable pressure chamber. A hub member is connected to the movable wall and has a projection extending air-tightly from the housing. The hub member is slidable relative to the housing. A control valve is disposed in the hub member and is manually actuated to interrupt fluid communication between the constant and vairable pressure chambers and to introduce ambient air into the variable pressure chamber thereby to generate an operational force of said movable wall. An output member transmits the operational force of the movable wall and the manual force applied to the control valve through a reaction force mechanism to an output arrangement. A partition wall is connected to and disposed in the housing for dividing the variable pressure chamber into a first and a second chamber. The first variable pressure chamber is normally connected to the control valve and the second variable pressure chamber is disposed next to the movable wall. A normally open valve controls fluid communication beteween the first and second variable pressure chambers with the normally open valve closing in response to an input signal.

3 Claims, 4 Drawing Sheets

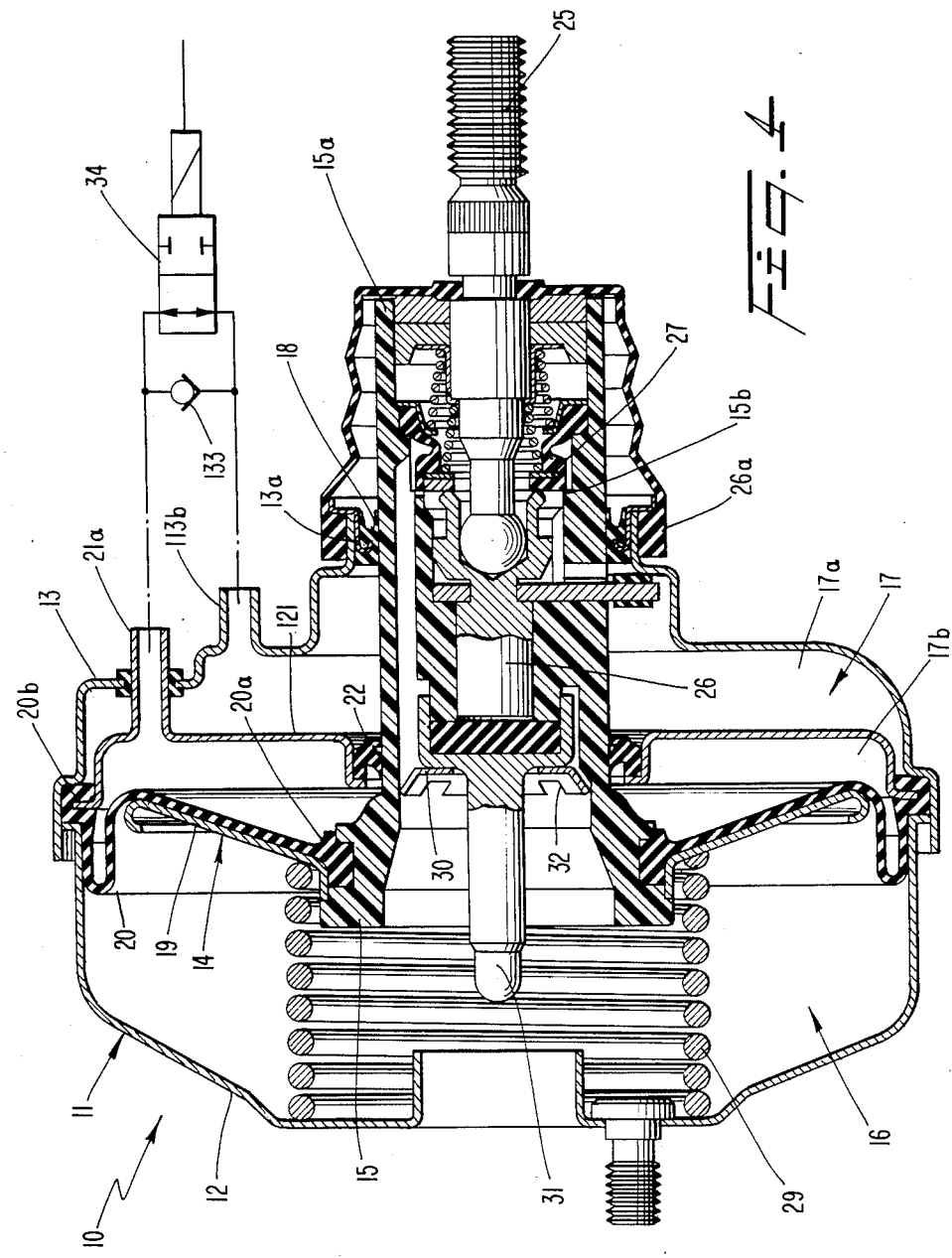

VACUUM TYPE BRAKE BOOSTER

BACKGROUND OF THE INVENTION

1. Field of the Invention

This invention relates to a brake booster and more particularly to a vacuum type brake booster for automobiles. An interior of the brake booster housing is divided by a movable wall into a constant pressure chamber connected to a vacuum source, such as intake manifold, and a variable pressure chamber with a hub member connected to the wall. The hub member includes therein a control valve which is manually operated to interrupt the fluid communication between the two pressure chambers and at the same time to allow an ambient air flow into the variable chamber for generating the operational force of the movable wall. Such operational force of the movable wall is transmitted to an output of the booster via a reaction mechanism.

2. Prior Art

Conventional boosters of the above type generate operational force on the movable wall only by manually actuating the control valve to introduce the pressure into the variable pressure chamber. In order to avoid continual depression of the brake pedal during parking of the vehicle while maintaining the complete stopping of the vehicle particularly on a sloped road, or, when the vehicle transmission is in "D" position, several proposals have been made.

One example is shown in Japanese patent publication No. 130845/82 wherein instead of using manual operation of a rod for actuating the control valve, an hydraulic actuator or an electromagnet is placed outside the body or within the hub member for actuating the control valve to introduce the ambient air into the variable pressure chamber thereby to generate the operational force of the movable wall. In this structure, however, a need for sufficient output from the actuator or from the electromagnet device exists to overcome the reaction force of the booster, which results in a size increase of the overall booster structure.

SUMMARY OF THE INVENTION

An object of the invention is to provide an improved brake booster in which the operational force of the movable wall continues to be generated even after the release of the actuator for the control valve.

BRIEF DESCRIPTION OF THE DRAWINGS

Preferred embodiments of the invention will be described in greater detail with reference to the accompanying drawings, wherein like members bear like reference numerals and wherein:

FIG. 4 is a cross-sectional view of a brake booster according to a fourth embodiment of the present invention.

DETAILED DESCRIPTION OF THE PREFERRED EMBODIMENTS

Figure 1:
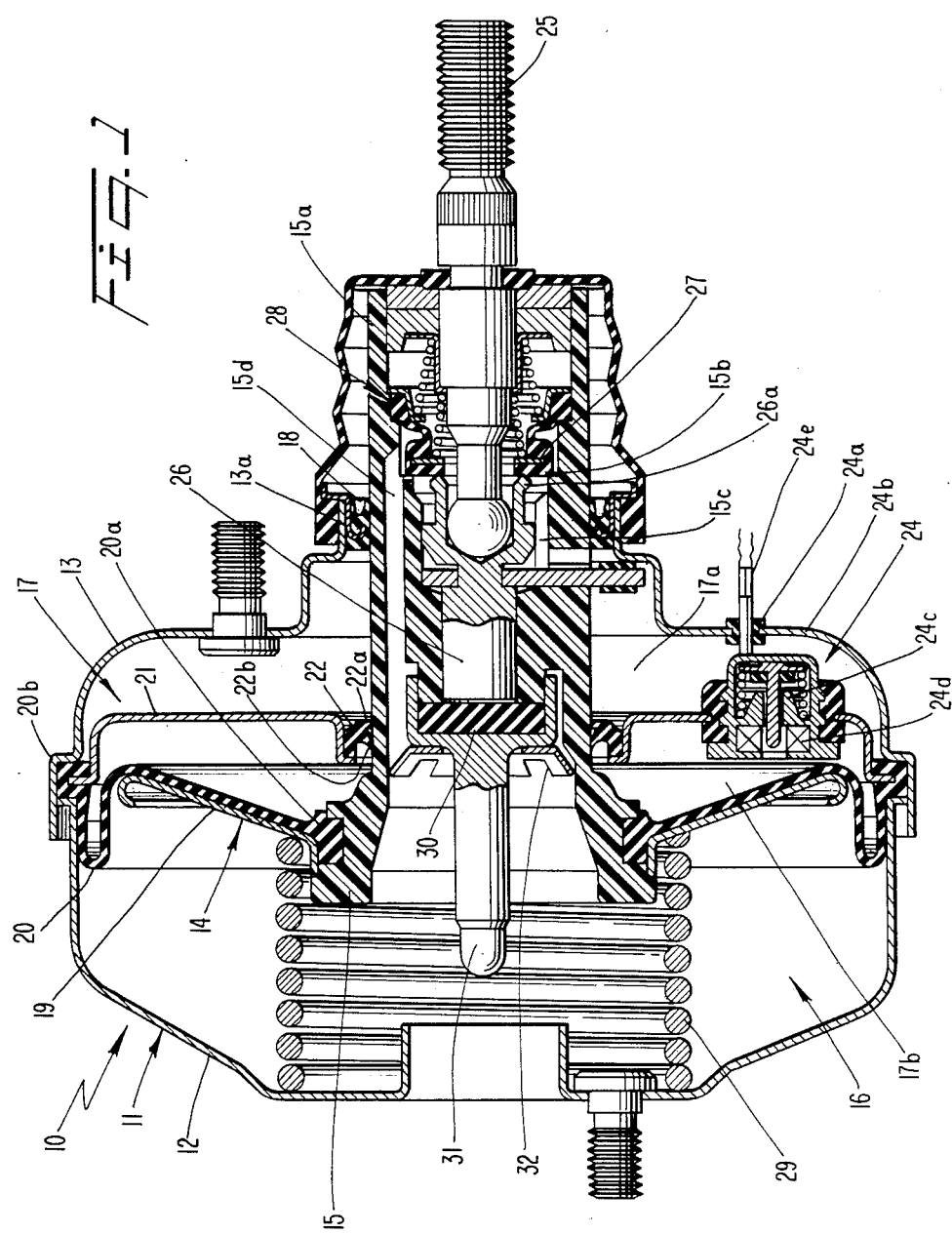
FIG. 1 is a cross-sectional view of a brake booster according to a first embodiment of the present invention.

With reference to FIG. 1, a vacuum brake booster is generally indicated by reference numeral 10. The booster 10 includes a body 11 made of two metal plate members 12 and 13 integrally connected together to form a booster housing. Within the body 11 a movable wall 14 and a hub member 15 made of resin are disposed to divide the interior of the body into two chambers —a constant pressure chamber 16 connected to a source of vacuum, such as an engine intake manifold (not shown) of receiving vacuum pressure therein, and a variable pressure chamber 17.

The hub member 15 includes a cylindrical portion 15a projecting air-tightly from the body 11 through a cylindrical opening 13a in which a guide and a seal device 18 is disposed. The movable wall 14 includes a soft pressure plate 19 of metal attached to the outer periphery of the hub member 15 and a diaphragm 20 of rubber attached to the hub member 15 at its thickened inner peripheral portion 20a and to the body 11 at its thickened outer peripheral portion 20b.

The variable pressure chamber 17 is divided into a first and a second variable pressure chamber 17a and 17b by a partition wall 21 secured to the body 11 and an annular seal 22 of rubber attached to the inner peripheral portion of the partition wall 21. The annular seal 22 is in slidable-sealing contact with the cylindrical portion 15a of the hub member 15 at its lip portions 22a and 22b.

A normally open valve 24, attached to the partition wall 21 through a seal 23, controls the fluid flow from the second variable pressure chamber 17b to the first chamber 17a and includes a valve member 24b which is normally separated from a valve seat 24c by a force of a small spring 24a thereby to establish the fluid flow between the two chambers 17a and 17b. However, when an electro-magnetic coil 24d is energized through a lead wire 24e that passes through the plate member 13, the force of the spring 24a is overcome and the valve member 24b is seated on the seat 24c to interrupt the fluid communication between the two variable pressure chambers 17a and 17b.

Within the hub member 15, a conventional control valve 28 is disposed. The control valve 28 includes a plunger 26 connected to a left end of an input rod 25 which is to be connected to a brake pedal (not shown), a seat 26a provided on a right end of the plunger 26, and a spring-biased poppet valve 27 of rubber which is disposed opposite a seat 15b formed on the hub member 15. When no operational force is applied to the input rod 25 in the left direction as viewed in FIG. 1, the first variable pressure chamber 17a communicates with the constant pressure chamber 16 through passages 15c and 15d provided in the hub member 15 When a leftward operational force is applied to the input rod 25, the control valve 28 is actuated to cut-off communication between the constant pressure chamber 16 and the first variable pressure chamber 17a and to introduce air into the variable pressure chamber 17 through relative movements of the elements of the control member 28, i.e., the plunger 26, the seat 26a, and the poppet valve 27. The introduction of air into the variable pressure chamber 17 generates a pressure differential between the constant and first variable pressure chambers 16 and 17a.

When the air is introduced into the first variable chamber 17a due to the actuation of the control valve 28 by the leftward movement of the input rod 25, the second variable pressure chamber 17b is also filled with the air introduced from the first variable pressure chamber 17a via the normally open valve 24 to increase the pressure therein. Due to the pressure differential between the constant and second variable pressure chambers 16 and 17b, the movable wall 19 becomes in operable condition. The actuation of the control valve 28 by the release of the input rod 25 establishes the fluid communication between the first variable pressure chamber 17a and the constant pressure chamber 16. Thus, the air in the first variable pressure chamber 17a is introduced into the constant pressure chamber 16 thereby to reduce the pressure in the first variable pressure chamber 17a. Under such conditions, the air in the second variable pressure chamber 17b is introduced into the first chamber 17a via the valve 24 thereby to reduce the pressure in the second variable chamber 17b, which leads to the reduction of the operational force of the movable wall 19. The hub member 15 and the movable wall 19 are returned to their original positions by the force of a spring 29.

When the electro-magnetic coil 24d of the valve 24 is energized when the movable wall 14 is operable due to movement of the input rod 25, the valve 24 is closed and interrupts the fluid communication between the two variable pressure chambers 17a and 17b. Upon release of the input rod 25, the control valve 28 is actuated by release of the control rod 25 to open communication between the constant pressure chamber 16 and the first variable pressure chamber 17a to reduce the pressure in the first variable pressure chamber 17a. Even with such a reduction of the pressure in the first chamber 17a, the movable wall maintains the operational force by the pressure differential between the constant pressure chamber 16 and the second variable pressure chamber 17b.

An output rod 31 is provided in the body and is adapted to be connected to a brake master cylinder (not shown) for trans output rod 31 to the hub member 15. A reaction disc 30 of rubber is provided in the recess of the output rod 31 for transmitting the reaction force to the plunger 26.

Figure 2:
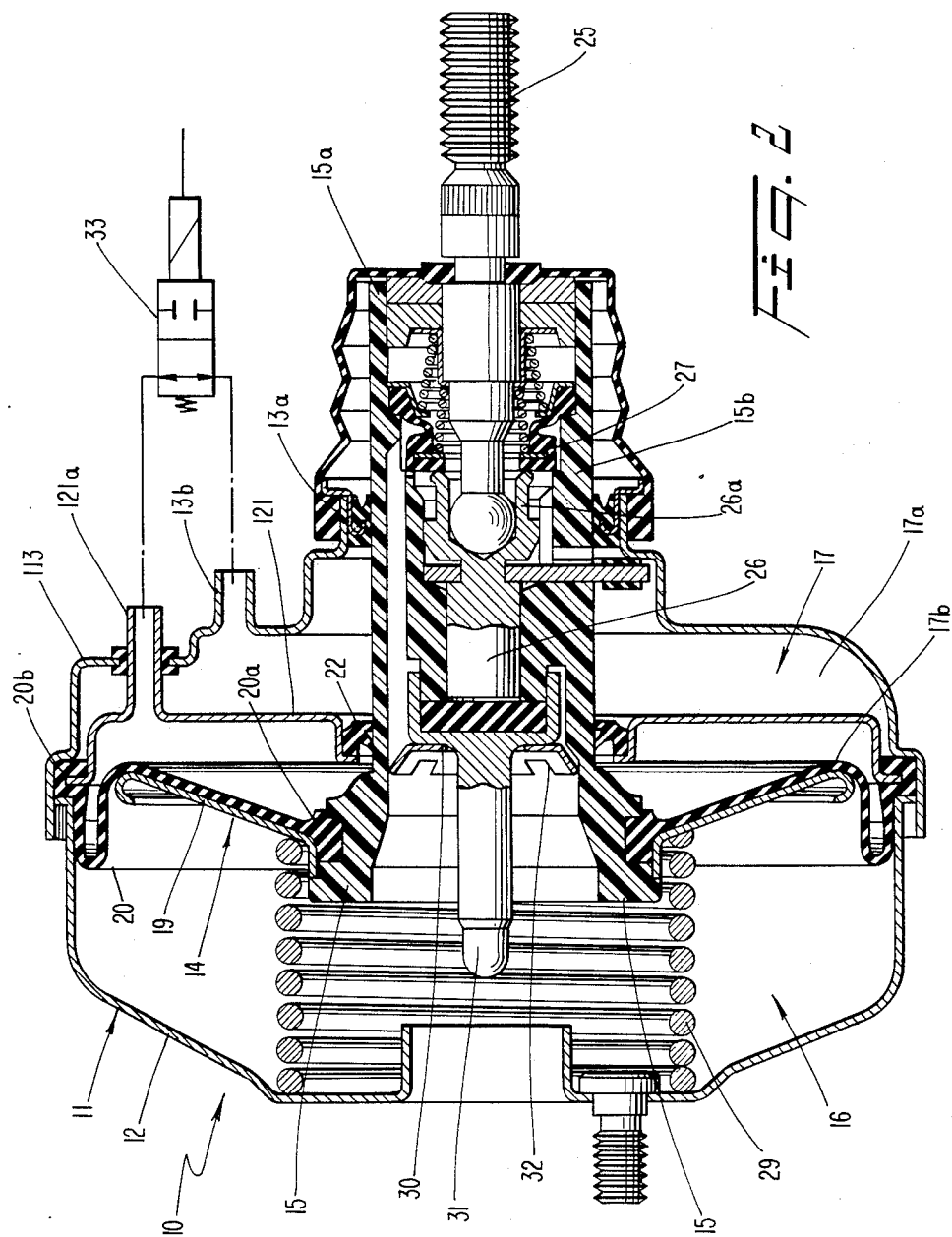
FIG. 2 is a cross-sectional view of a brake booster according to a second embodiment of the present invention.

With reference to FIG. 2, a second embodiment has most of the parts and the components the same or similar to those in FIG. 1 and therefore detailed repetition of the explanation will be omitted.

The normally open valve 24 in the previous embodiment (FIG. 1) is indicated as 33 in FIG. 2 and is disposed outside the booster housing or body 11. A partition wall 121 in this embodiment includes an opening 121a for fluid communication between the second variable pressure chamber 17b and first variable pressure chamber 17a via the valve 33 located outside of the housing. A metal plate member 113 is provided with a pipe portion 113b for connection between the first variable chamber 17a and the valve 33.

Figure 3:
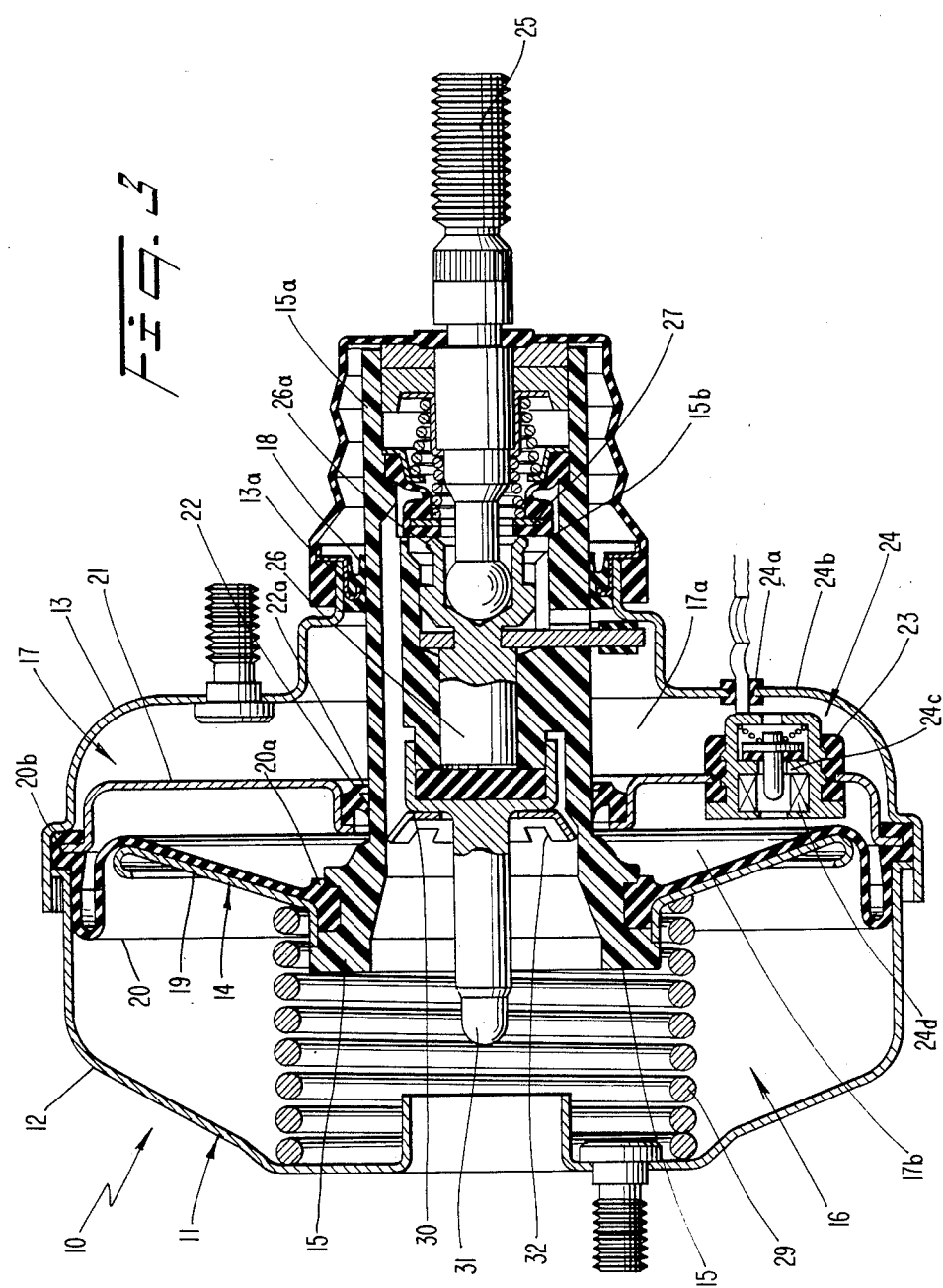
FIG. 3 is a cross-sectional view of a brake booster according to a third embodiment of the present invention.

With reference to FIG. 3, a third embodiment also has most of the parts and the components the same or similar to those in FIG. 1 and therefore the detailed explanation will not be repeated.

The variable pressure chamber 17 is divided into a first and a second variable pressure chambers 17a and 17b by a partition wall 21 secured to the body 11 and an annular seal 22 of rubber is attached to the inner peripheral portion of the partition wall 21. The annular seal 22 is in slidable contact with the cylindrical portion 15a of the hub member 15 at its lip portion 22a. This lip portion 22a serves as a one way valve for allowing the fluid flow from the first to the second variable pressure chambers upon pressure differential across the two chambers but interrupting the fluid flow in the opposite direction (from the second chamber 17b to the first chamber 17a).

When air is introduced into the first variable chamber 17a due to the actuation of the control valve 28 by the leftward movement of the input rod 25, the second variable pressure chamber 17b is also filled with the air introduced from the first variable pressure chamber 17a by separating the lip portion 22a of the annular seal 22 from the outer peripheral portion of the cylindrical portion 15a. Accordingly, the pressure in the second variable pressure chamber 17b increases.

Due to the pressure differential between the constant pressure chamber 16 and the second variable pressure chamber 17b, the movable wall 19 becomes in operable condition. The actuation of the control valve 28 by the release of the input rod 25 establishes the fluid communication between the first variable pressure chamber 17a and the constant pressure chamber 16. Thus, the air in the first variable pressure chamber 17a is introduced into the constant pressure chamber 16 thereby to reduce the pressure in the first variable pressure chamber 17a. Under such conditions, the air in the second variable pressure chamber 17b is introduced into the first chamber 17a via the valve 24 to reduce the pressure in the second variable chamber 17b. The decreased pressure in the second variable chamber 17b leads to the reduction of the operational force of the movable wall 19. The hub member 15 and the movable wall 19 are returned to their original positions by the force of the spring 29.

With reference to FIG. 4, a fourth embodiment has most of the parts and the components the same or similar to those in FIG. 2 and FIG. 3 and therefore a detailed explanation will be omitted. The one way valve formed by the lip portion 22a in the third embodiment is replaced by a one way valve 133 in FIG. 4 and is disposed outside the booster housing or body 11. A partition wall 121 in this embodiment is similar to that of FIG. 2 and a detailed description is omitted. The one way valve 133 is located outside the housing and is in parallel to the normally open valve 34.

The principles, preferred embodiments and mode of operation of the present invention have been described in the foregoing specification. However, the invention which is intended to be protected is not to be construed as limited to the particular embodiments disclosed. The embodiments are to be regarded as illustrative rather than restrictive. Variations and changes may be made by others without departing from the spirit of the present invention. Accordingly, it is expressly intended that all such variations and changes which fall within the spirit and scope of the present invention as defined in the claims be embraced thereby.

What is claimed is:
1. A booster comprising:
   a booster housing;
   movable wall means disposed in said booster housing and dividing the interior of the housing into a constant pressure chamber connected to a vacuum source and a variable pressure chamber;
   a hub member connected to said movable wall means and having a projection extending air-tightly from said housing, said hub member being slidable relative to said housing;
   control valve means disposed in said hub member or causing the interruption of fluid communication between said constant and variable pressure chambers and for introducing ambient air into said variable pressure chamber thereby generating an operation force on said movable wall means;

manual actuation means for manually actuating said control valve means;

an output member transmitting said operation force of said movable wall means and said manual force applied to said control valve means through a reaction force mechanism to an output means;

a partition wall connected to sand disposed in said housing for dividing said variable pressure chamber into first and second variable pressure chambers, said first variable pressure chamber being normally connected to said control valve means and said second variable pressure chamber being disposed next to said movable wall means; and operational force maintaining means for maintaining the operational force of said movable wall means regardless of the position of said manual actuation means, said operational force maintaining means including further valve means for normally allowing fluid flow from said second variable pressure chamber to said first variable pressure chamber and for interrupting said fluid flow in response to an input signal.

2. The booster according to claim 1, wherein said further valve means is arranged outside of said booster housing.

3. The booster of claim 1, wherein the further valve means includes a solenoid actuated valve element.

* * * * *